United States Patent [19]
Stachoviak et al.

[11] Patent Number: 6,117,593
[45] Date of Patent: Sep. 12, 2000

[54] CURRENT COLLECTOR MANUFACTURE BY ARC SPRAY DEPOSITION

[75] Inventors: Timothy J. Stachoviak, Waunakee; Joseph P. Nestler, Verona; Daniel A. Schneider, Madison; Shirley A. Craanen, Madison; Amy K. Lawrence, Madison, all of Wis.

[73] Assignee: Johnson Manufacturing, LLC, Smyrna, Ga.

[21] Appl. No.: 09/097,776

[22] Filed: Jun. 15, 1998

[51] Int. Cl.[7] .................................................. H01M 4/70
[52] U.S. Cl. ........................ 429/242; 29/623.5; 429/127; 429/236
[58] Field of Search .......................... 29/623.5; 429/245, 429/124, 127, 128, 236, 237, 241, 242

[56] References Cited

U.S. PATENT DOCUMENTS

| 4,070,528 | 1/1978 | Bergum et al. | 429/152 |
| 5,370,950 | 12/1994 | Kageyama | 429/232 |
| 5,403,680 | 4/1995 | Otagawa et al. | 429/213 |
| 5,436,091 | 7/1995 | Shackle et al. | 429/192 |
| 5,523,179 | 6/1996 | Chu | 429/104 |
| 5,716,422 | 2/1998 | Muffoletto et al. | 29/623.5 |

*Primary Examiner*—Carol Chaney
*Attorney, Agent, or Firm*—Kennedy, Davis & Hodge, LLP

[57] ABSTRACT

Arc spray deposition of molten metal droplets on plastic electrodes creates a tight bonded adhesion and increases the surface area contact between collector and electrode. This is especially efficacious for lithium secondary batteries which are known to flex during charge and discharge cycles leading to battery failure. The strength of the bonding interaction, and a resistance to stress cracking are observed when a perforated or expanded metal strip is utilized to reinforce the arc spray deposited metal collector.

8 Claims, 15 Drawing Sheets

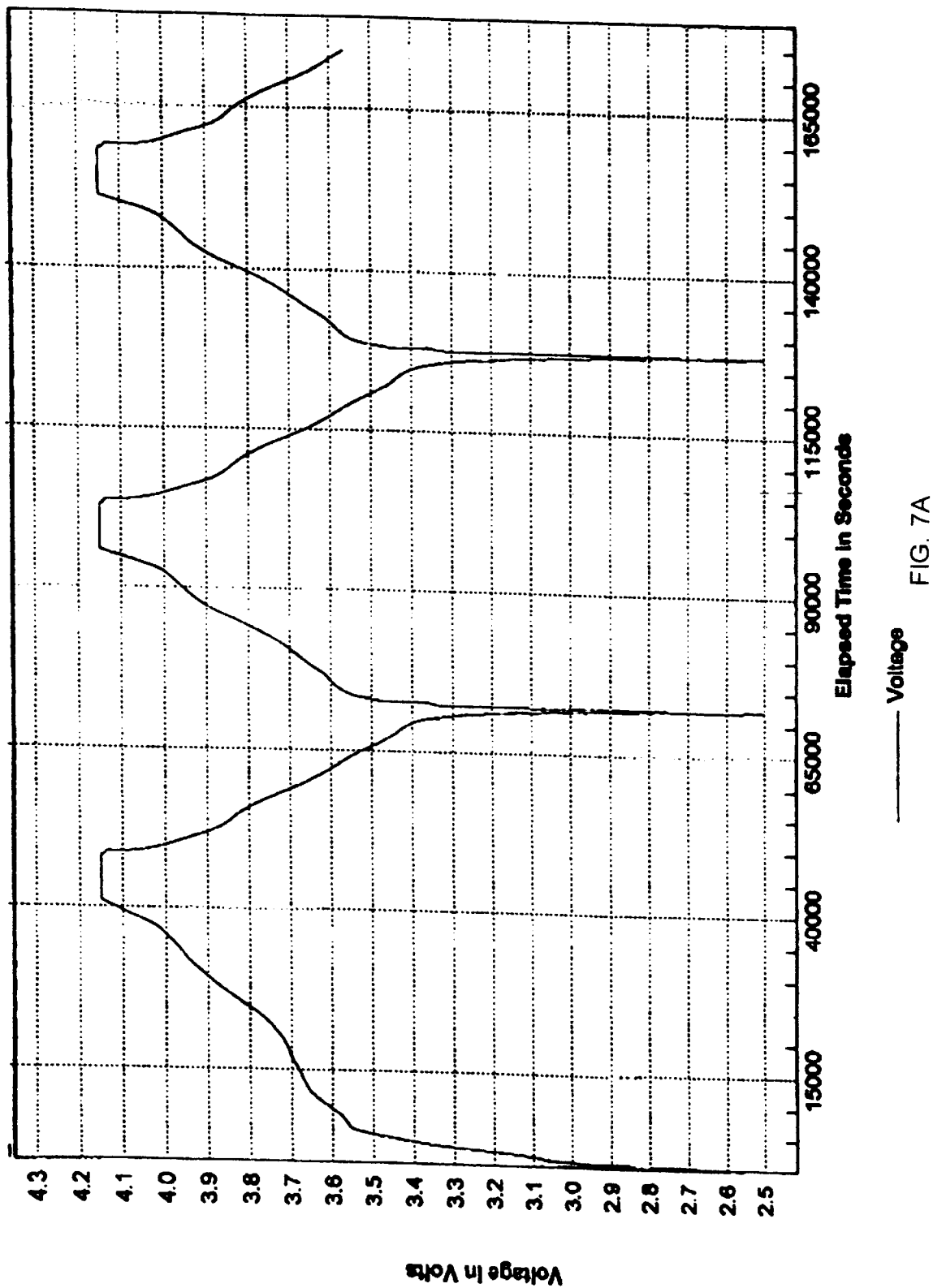

CURRENT COLLECTOR MANUFACTURE BY ARC SPRAY DEPOSITION

FIELD OF THE INVENTION

The present invention relates to battery construction, and more particularly to the current collector components of a multilayered electric cell having one or more plastic electrodes. The invention has particular efficacy in secondary battery systems subject to high materials stress of expansion and contraction during repetitive intermittent cycles of charge and discharge.

BACKGROUND OF THE INVENTION

In the construction of any battery, six components are universally present: two electrodes (positive and negative), electrolyte, housing, an ion permeable separator between positive and negative electrodes, and the current collectors. The chemical reactions that occur in the electrodes are mediated by ion flow therebetween. Since there is a net change in electric charge, the excess electrons must be transferred for one electrode to the other along a path that generates an electric current.

The current collector functions to gather the electrons at one electrode and discharge them at the other. The efficiency with which electron uptake and discharge takes place affects battery capacity, charge density, and conductivity Thus, current collectors are generally made of sheets of highly conductive materials such an metals. Typical metallic collectors are composed of copper, aluminum, gold, silver, tin, or nickel. In battery construction there are several potential problems relating to the current collectors.

If the surfaces between electrode and collector are uneven, contact will be impaired and there will be surface gaps which interrupt electron flow. Similarly, if contact is maintained by a press fit, the pressure applied must be uniform. Also, there is a tendency for laminated-type batteries, to come apart at the interface of electrode and current collector. Some of these problem are intensified in the field of secondary batteries, since the expansion/contraction phenomenon during charge and discharge cycles causes successive bending of the materials back and forth. The differential coefficients of expansion/contraction of the materials in the battery components tends to pull the layers apart.

In the construction of many batteries, including secondary lithium batteries, various strategies have been developed to maintain contact between current collector and electrode. Pressure laminants contained in rigid battery housings are disclosed in U.S. Pat. No. 5,478,668. U.S. Pat. No. 4,710, 439 disclosed a swagelock construction for test cells, in which the components are maintained in contact by mechanical pressure. Another important construction strategy, described representatively in U.S. Pat. No. 4,550, 064, is to tightly wind the layers of battery components in a spiral, thus obtaining strong adhesive pressures partially by exerting sheer during the winding.

Adhesion of plastic polymer based electrodes to current collectors in plastic lithium ion secondary batteries is a particularly difficult problem because plastic and metal interfaces do not inherently provide appreciable natural molecular adhesion interactions. Several approaches have been devised to overcome this problem. U.S. Pat. No. 5,591,544 discloses a primer material, preferably carbonaceous, which is interposed between the electrode and an aluminum current collector. The primer improves adhesion presumably because adhesion of both the metal and the plastic to the primer is better than between metal and electrode. Another advantage is that the primer retards oxidation of the aluminum which interferes with conductivity. U.S. Pat. No. 5,589,297 also applies a basement layer to increase adhesion of the current collector.

A different approach is disclosed in U.S. Pat. No. 5,587, 253 in which a perforated metal electrode is embedded within the electrode. This has two advantages, namely, the crosslinked polymer communicating covalently with the body of polymer electrode on each side of the collector forms a strong unitary structure, and secondly, the distance of travel for electrons is half the distance for an electrode of the same thickness in which the collector is applied to only one side. The disadvantage is loss of current collector surface area because of the perforations. In an alternate embodiment of this concept, U.S. Pat. No. 5,554,459 utilizes an embedded metallic grid rather than perforated metal. In a third approach, U.S. Pat No. 5,584,893 discloses that application of electrode directly to the current electrode as a slurry improves adhesion.

From the foregoing, it is apparent that a prominent challenge in the battery art is to obtain intimate adhesion of metallic current collector to electrode, particularly plastic-based electrodes, while at the same time maintaining or even increasing the surface area of contact between collector and electrode. The improvement in adhesion should be such that the cell is highly resistant to debonding between electrode and current collector during cycling of secondary batteries.

SUMMARY OF THE INVENTION

In the field of secondary batteries, the layered components typically flex during charge and discharge cycles putting considerable stress on the components. Battery failure frequently ensues as a result of this stress causing the components to pull apart or become disoriented. This particularly occurs at the interface of the current collectors and electrodes. The vulnerability of this juncture is related to the difference in materials, usually metal against plastic in which there is no natural adhesive properties or affinity between the two materials.

It is therefore an object of this invention to create a bonded interaction between the current collectors and electrodes that relies upon physical interconnectedness and not a chemical-based intervention to minimize the inherent chemical incompatibility between the materials.

It is another object of this invention to enhance rather than diminish the efficiency of electron transfer by increasing the surface area of interaction between the current collector and electrodes.

It is a still further object to provide a secondary battery whose current collector-electrode interface can withstand in excess of 150 charging and discharging cycles without failure.

In its simplest embodiment, the present invention comprises a metallic current collector-electrode bonded structure in which a thermoplastic electrode having a facing and opposite side, is bonded to a current collector comprising thermal sprayed metal droplet particles partially embedded in the facing side of the electrode, and presenting a smooth substantially continuous surface of partially coalesced metal droplet particles on its opposite side. In a somewhat stronger embodiment a metal strip consisting of a perforated metal sheet or an expanded metal grid is interposed between the layer of partially embedded metal droplet particles and the electrode. The collector function itself is a construct comprising a layer consisting of a metal strip having a plurality of spaces traversing the thickness of the metal strip, and a second substantially continuous layer of the same or a different metal composed of a multiplicity of partially coalesced metallic droplet particles smaller in size than the spaces in the metal strip, and actually filling the spaces. The spaces may be holes of varying or similar size or a grid pattern. Each hole may hold up to 200 or more 0.3 to 1.0 micron diametered particles.

In a further embodiment of the current collector-electrode structure, a layer comprising a bonded coating of partially coalesced metallic droplet particles partially embedded continuously over the facing surface of the electrode, is combined with a second outer layer which is the metal strip for reinforcement containing a multiplicity of spaces filled with partially coalesced metal droplet particles, and a third outer layer forming a substantially continuous surface opposite the collector facing surface.

These features of the current collector and electrode can be incorporated into many otherwise conventional battery configurations. For a lithium ion battery having a housing, a separator, negative and positive plastic electrodes, electrolyte solution saturating the separator and electrodes, and current collectors, the improvement comprises the single, double and triple layered structures disclosed above. While the double and especially the triple layered correctors are preferred, and lead to some unexpected results in performance, they all share the concept of creating a physical bond by deposition of thermal metal deposition at temperature at or greater than the transition melting point of the polymeric electrode material.

Where an entire battery is assembled, the invention incorporates two separate current collectors for each electrode composed of different metals. Thus a first current collector has a first layer of a metal strip having a plurality of spaces filled with partially coalesced metallic droplet particles of the same or different metal partially embedded in the contiguous negative electrode outer surface to form a bond, and then forming a second layer of partially coalesced metallic droplet particles onto the metal strip. The second current collector has the same structure only the coalesced metallic droplet particles may be of the same or different metal, but different from the metal strip or coalescing droplet particle metal for the negative electrode.

In the method of this invention, a contiguous metal strip is positioned against the facing surface of the electrode, and the second layer of the collector is applied as a thermal spray, preferably arc spray, of molten metal droplets onto the outer side of the metal strip layer until there is formed a substantially continuous bonded coating of partially coalesced droplet particles.

BRIEF DESCRIPTION OF THE DRAWINGS

FIGS. 7a and 7b are rectilinear plots showing the charge and discharge voltage profiles of a third lithium ion battery of this invention (a) and the corresponding capacity curves (b).

DETAILED DESCRIPTION OF THE PREFERRED EMBODIMENT

Figure 1A:
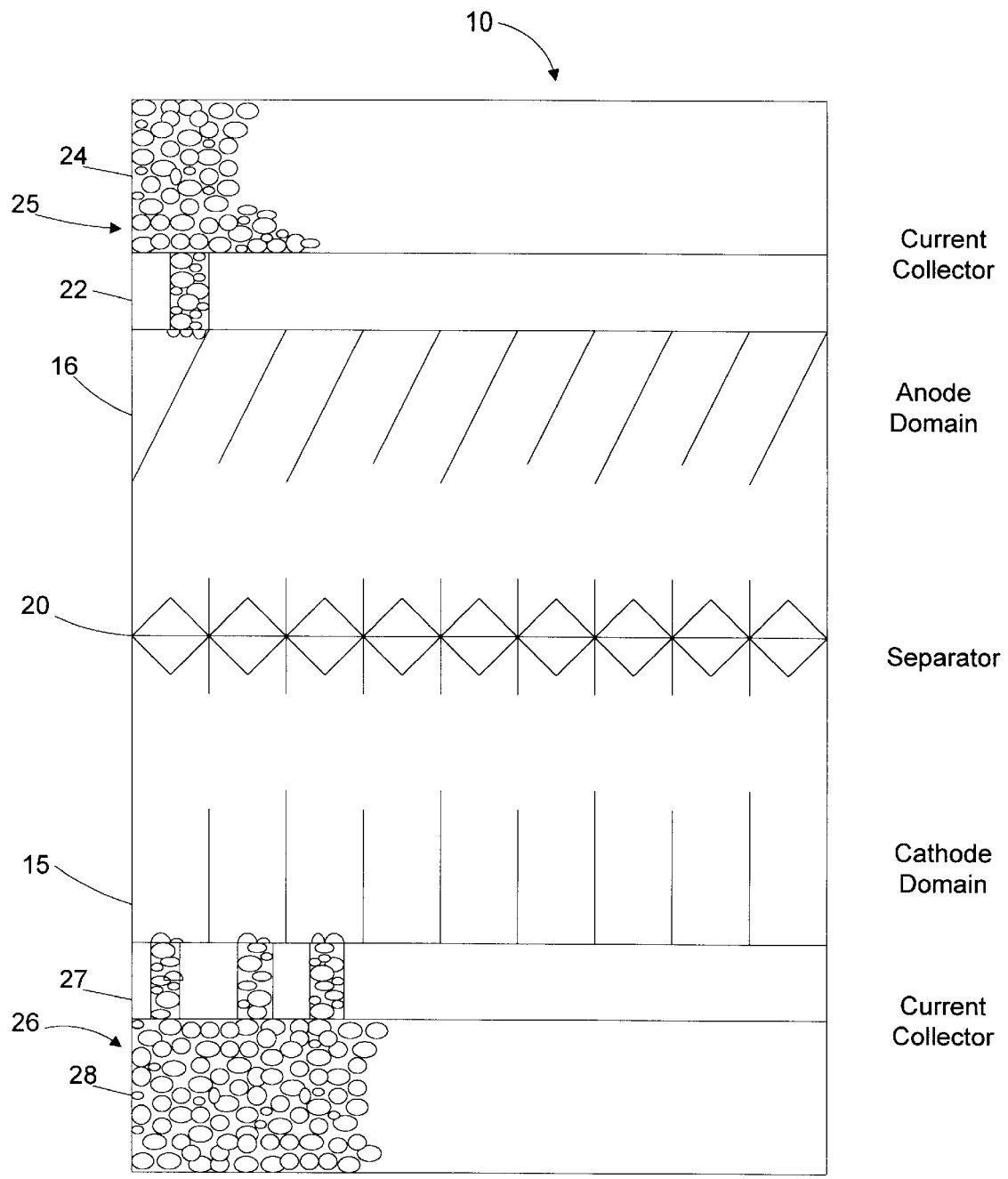
FIG. 1a is a schematic cross-sectional drawing showing a plastic layered battery of the preferred embodiment showing the bonding of the current collector to the electrodes by embedding of metallic droplets into the electrodes by application thereof to a grid by an arc sprayer.

In solid state rechargeable lithium ion batteries, the bonding of the separator, anode and cathode, and current collectors, are critical not only to the proper functioning of the battery, but also to its manufacturability. Many manufacturing strategies are known in the art for causing the anode, cathode, separator, and current collector elements to be juxtaposed, so that ions can flow freely back and forth between the electrodes in successive charging and discharging cycles, while electrons are gathered efficiently by electron conductive collectors. For example, the layers can be aligned and then wound into a tight coil, or may be compressed and restrained mechanically. Ideally, however, a stable composite structure of highly elastic construction would permit a much larger range of use and shapes, providing extreme flexibility in the types of housings that contain the battery components.

Electrodes in solid state lithium ion batteries are fabricated from lithium compounds dispersed in thin-layer, porous polymeric sheets. Typically in a solid state lithium ion battery, the cathode is a dispersed lithiated metal oxide with or without a binder. Examples include LiMO where MO is Co, Ni, Mn, or V metal oxides of appropriate valence. Conventional methods of manufacturing cathodes are disclosed in U.S. Pat. Nos. 5,296,318, 4,550,064, 5,260,148, 5,518,842 and 5,380,606 hereby incorporated by reference.

Anodes in solid state lithium ion batteries are typically carbonaceous, comprised of various forms of synthetic or natural graphite, petroleum coke or doped coke. Lithium ions are intercalated into the carbonaceous material to yield $LiC_6$ (graphite) or $LiC_{12}$ (coke). U.S. Pat. No. 5,219,680 discloses a method for making such an electrode by entrapping amorphous carbon in a polymeric premix followed by in situ polymerization around a metallic collector element.

U.S. Pat. No. 5,514,490 discloses an unusual anode utilizing a layered titanium phosphate followed by intercalation of Li. A further type of anode material useful with the present separator is a noncrystalline carbon having low density, and a particular Raman spectrum, as disclosed in U.S. Pat. No. 5,401,598. A preferred carbonaceous or other lithium intercalation anode material is compacted graphite dispersed in a porous polymeric matrix. The anode may also include rocking chair compounds, for example $Li_xWO_2$, $Li_xMoO_2$ and $Li_xTiS_2$ and the like. The foregoing patents are hereby incorporated by reference.

For the purpose of this application, electrode active materials include carbonaceous lithium ion intercalating materials, lithiated metal oxides, and rocking chair anode compounds. Lithiated metal oxides include $LiCoO_2$, $LiNiO_2$, $LiMn_2O_4$, and the like. Further cathode and anode materials are described in detail in Hossain, supra.

The plasticizers of the present invention are non-aromatic, aliphatic diesters of the general formula $R_1OOC(CH_2)_nCOOR_2$ wherein $R_1$ and $R_2$ are methyl-, ethyl-, propyl-, butyl-, or combinations thereof, and n is 1 to about 7. The plasticizer must be capable of uniform micro-dispersion throughout the coating layer, so that upon removal a network of microscopic pores renders the coating ion permeable. Optionally, lithium salts contained in the electrolyte solution may be included in the polymer, plasticizer, solvent mixture, so that upon removal of the plasticizer in the polymer coating, a uniform dispersal of lithium salts is obtained in situ.

The separator may simply comprise a porous polymer matrix providing sufficient separation between electrodes to prevent the formation of a circuit which causes a short circuit of the battery. This polymer matrix may be composed of olefin, polyvinylidene difluoride and its associated copolymers, polyvinyl alcohol and the like.

Preferably, the separator of the present invention consists of two parts, an inner core matrix of a fibrous homopolymer, embedded in a sheet of porous elastic polymer. The core matrix is a fabric-like composite manufactured in preformed rolls by several vendors such as Web Dynamics and Hollingsworth/Vose.

These materials are made of minute polymer fibers, finely comminuted into fibers about 0.1 micron in diameter to about 1.5 microns in length. Structurally the matrix fibers are deposited randomly to create very small pores throughout the fabric body. These matrices may be manufactured by deposition of fibers in the desired thickness onto a running conveyor track, and compressed under rollers into sheets in a process similar to paper manufacture. Alternatively, the fiber sheets may be melt blown. The resultant fiber matrix is preferably 0.75 to 5.0 mils in thickness and has a density of between 15 and 50 grams/sq. meter. Finer materials may be obtained by custom manufacture. Since it is desirable to reduce the ion path between electrodes to every extent, the custom materials will have a target thickness of less than 0.75 mils with a slight increase in density. It is only in the present process, which permits complete saturation of the fiber vacuoles with plastic, that the thickness of the fibrous core and the overall separator can be reduced to 1.75 to 3.00 mils overall without strength failure.

The homopolymers of the separator fibers are selected from polyethylene, polypropylene, polyvinylalcohol, and the like, manufactured by conventional methods. The fibers are made up of semi-randomly disposed strands of high molecular weight polymer. Combinations of homopolymers may theoretically be employed. The homopolymers, being readily commercially available in pre-formed sheets, have a very low unit cost, and are manufactured according to specifications giving good reproducibility in battery applications. The fiber matrix provides strength and resilience, which may account for its resistance to fracture.

The selection of the elastic polymer is largely dependent upon the composition of the core matrix material. In the situations in which polyethylene or polypropylene fiber is used, a polymeric infusion of polyvinylidene difluoride is preferred. For a polyvinylalcohol core, a water compatible interpositional material such as Kynar® Latex milk (Elf-Atochem) or a teflon dispersion such as Dupont T-30 is preferred. The fundamental requirement is that the elastic polymer sheet formed after vacuum diffusion be porous, or be capable of being rendered porous, to permit ion transport. Typically, the polymer, which is a powder, is dispersed in an organic solvent such as acetone. A plasticizer is added, the viscosity is adjusted by curing at room temperature or slightly elevated temperatures at 40–60° C., and the mixture is applied to the fibrous core, as follows:

The fibrous core is placed on a vacuum table and vacuum is applied to the core side face down on the table. A laterally moving casting block is filled with the polymeric mixture and applied to the upper surface by spreading at the desired thickness. The vacuum continues to be applied until all of the solvent has been drawn off. The vacuum is released, the fibrous core fabric is inverted so that the vacuum side is now exposed, and the vacuum process is repeated with the casting block. Multiple thin coatings may be applied, and result in a smoother, more uniform coating.

In this process, the polymeric mixture is pulled by the vacuum into the fibrous core matrix, completely filling the interstitial void spaces. The proportion of solvent is large enough (greater than 20 percent by volume), so that when the polymer fronts advancing through the fibrous core meet and overlap, the residual solvent reliquifies the surrounding polymer, and when dried of the solvent, forms a continuous, unitary polymeric sheet in which the fibrous core matrix is embedded. There are no true layers of polymer on the fibrous matrix, the interfaces between the advancing polymer boundaries having merged to lose completely any independent identity. The resulting structure is very pliant, translucent, and smooth, but extraordinarily strong, as shown in the Examples.

The overall thickness of the separator is important because it defines the path length from one electrode to the other. As pointed out above, custom manufacture can reduce the thickness of the matrix.

The thickness of polymer remaining on the separator surfaces should be a minimum of about 0.5 mils. Joining of the electrodes, particularly in continuous composite construction, requires about 1.0 mil. In any event, it appears that a more uniform coating is achieved when an excess of polymeric mixture is run onto the matrix surface for distribution by the casting block.

The vacuum table is a flat manifold having a large plurality of holes approximately 1.0 to 5.0 mm in diameter. A fine mesh screen (200×200 mesh) is placed over the manifold to prevent the matrix from being pulled into the holes. A typical vacuum assembly for laboratory scale utilizes a Variac in combination with a vacuum pump fitted with a 1–6 hp motor. An adequate amount of polymeric mixture is achieved when the interstitial spaces of the fiber matrix are saturated with polymeric mixture. Saturation has occurred when the void spaces are completely filled.

On an industrial scale, it may be impractical to apply polymeric mixture to a single flat sheet at a time. The present method is adaptable to preparation of an entire roll of fabric stock by passing the stock through a coating bar, and then infusing the polymeric mixture into the matrix by passing over a vacuum drum, first on one side and then coating again and passing the reverse side over a second vacuum drum. For multiple coatings, a corresponding plurality of drums may be employed.

Application of coating may be effected by any conventional method including spreading or casting with a doctor blade, rolling, or controlled spraying. The ratio of ingredients in the coating mixture will affect the porosity and adhesive properties of the coated structure. The ratio of polymer to plasticizer should preferably be on the order of 2:1 to 1:10, and the ratio of polymer/plasticizer to acetone may be between about 1:5 to 2:1 for best results. Ratios are expressed as w/w. Fillers such as $TiO_2$ or $SiO_2$ appear to be unnecessary in the coating to provide material strength.

The secondary battery components that can be used with the composite separator and electrode of the present invention are electrolyte and current collector systems known in the solid state (dry) lithium ion field of battery technology using plastic electrode and separator materials. In the electrolyte solutions, typical lithium salts include $LiPF_6$, $LiASF_6$, $LiBF_4$, $LiClO_4$, $LiN\ (CF_3SO_2)_3$, and $LiN\ (SO_2C_2F_5)_3$. Typical solvent systems for dispersion of the lithium salt include diethyl, ethyl, propyl, or dimethyl carbonate, or mixtures thereof, tetrahydrofuran, 1,2-dimethoxyethane, and other organic solvents in which lithium salts can ionize. In general, solvents of low viscosity are preferred (<0.5 cP at 25 degrees C.), to facilitate ion migration and diffusion. Water adsorption characteristics are important, since lithium salts are highly unstable in aqueous environments. Suitable solvents must have a water content of less than 10 ppm.

The best mode known to Applicants of the present current collector is a composite plastic electrode and separator for use in any type of battery, preferably a lithium ion battery. The composite can comprise an anode and separator, a cathode and separator, or preferably an anode, cathode and separator. The electrodes are comprised of electrode active materials dispersed in a plasticized polymer matrix. The separator may be any polymer structure which provides sufficient separation between electrodes to prevent the formation of a circuit which causes a short circuit of the battery; preferably, the separator is a polymer coated and impregnated fibrous mat formed by vacuum coating.

The electrode active materials are mixed into slurries containing solvent, polymer and plasticizer.

In a preferred method, the slurry contains a relatively high percentage of solvent (about 45 to 60 percent by weight.) The slurry further contains about 30 to 50 percent by weight of electrode active material. A cathode slurry can preferably contain about 2 to 10 percent by weight carbon black to improve conductivity. The slurry further may contain plasticizer in a ratio of polymer to plasticizer of about 2:1 to 1:10 by weight. The separate anode and cathode slurries may be referred to collectively as electrode slurries or first and second electrode slurries.

These electrode slurries are applied to the separator, preferably the vacuum coated non-woven polymer mat (polymer saturated separator) described above. Application of the slurry may be accomplished, without limitation, by casting, screen printing, spraying or electrodeposition and the like.

The bonding process of the present invention is carried out by curing the electrode slurries in a solvent enriched or charged atmosphere. The solvent enriched or charged atmosphere contains solvent vapor in a concentration higher than is normally found in the atmosphere. The atmosphere is normal air.

In practice, the separator is preferably immobilized on a solid support capable of drawing a vacuum across its surface, such as a vacuum drum surface or flat-bed vacuum surface. The first electrode slurry is then applied to the first side of the separator forming a separator-first electrode slurry structure. The separator-first electrode slurry structure then is enclosed or partially enclosed in a solvent vapor retention means, such as a box, container or other enclosure allowing the transient formation of a solvent vapor enriched or charged atmosphere. The slurry coated side of the separator is exposed to the interior of the vapor retention means and the non-slurry coated side of the separator is exposed to the outside atmosphere. The slurry coated separator is positioned within the vapor retention means so that the slurry is suspended upside down. As the electrode slurry cures, the evaporated solvent accumulates in the vapor retention means creating a solvent vapor enriched or charged atmosphere. As curing continues, the solvent enriched atmosphere of the container eventually equilibrates with the outside atmosphere as the solvent passes through the forming electrode and separator composite and into the outside atmosphere.

After the first electrode slurry cures, normally about 5 to 30 minutes, the separator-first electrode structure is then immobilized on drum vacuum surface or flat-bed vacuum surface and coated on the second separator side with the second electrode slurry. This structure is then enclosed or preferably partially enclosed in a vapor retention means. The second electrode slurry coated side of the separator-first electrode structure is exposed to the interior of the container, the first electrode side is exposed to the outside atmosphere and the second electrode slurry is suspended upside down from the separator-first electrode structure. The bonding process occurs as above.

Figure 7B:
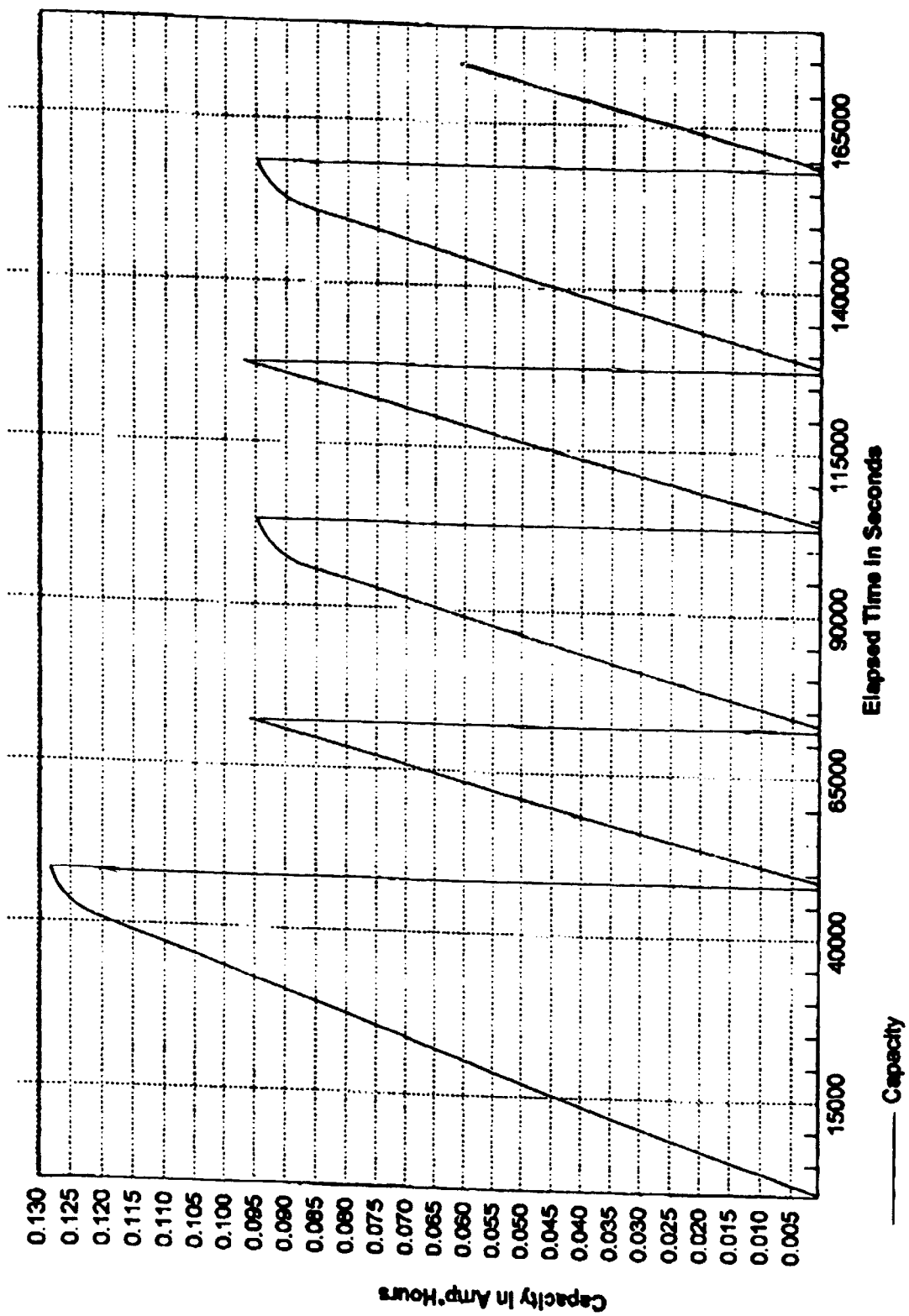
Figure 8:
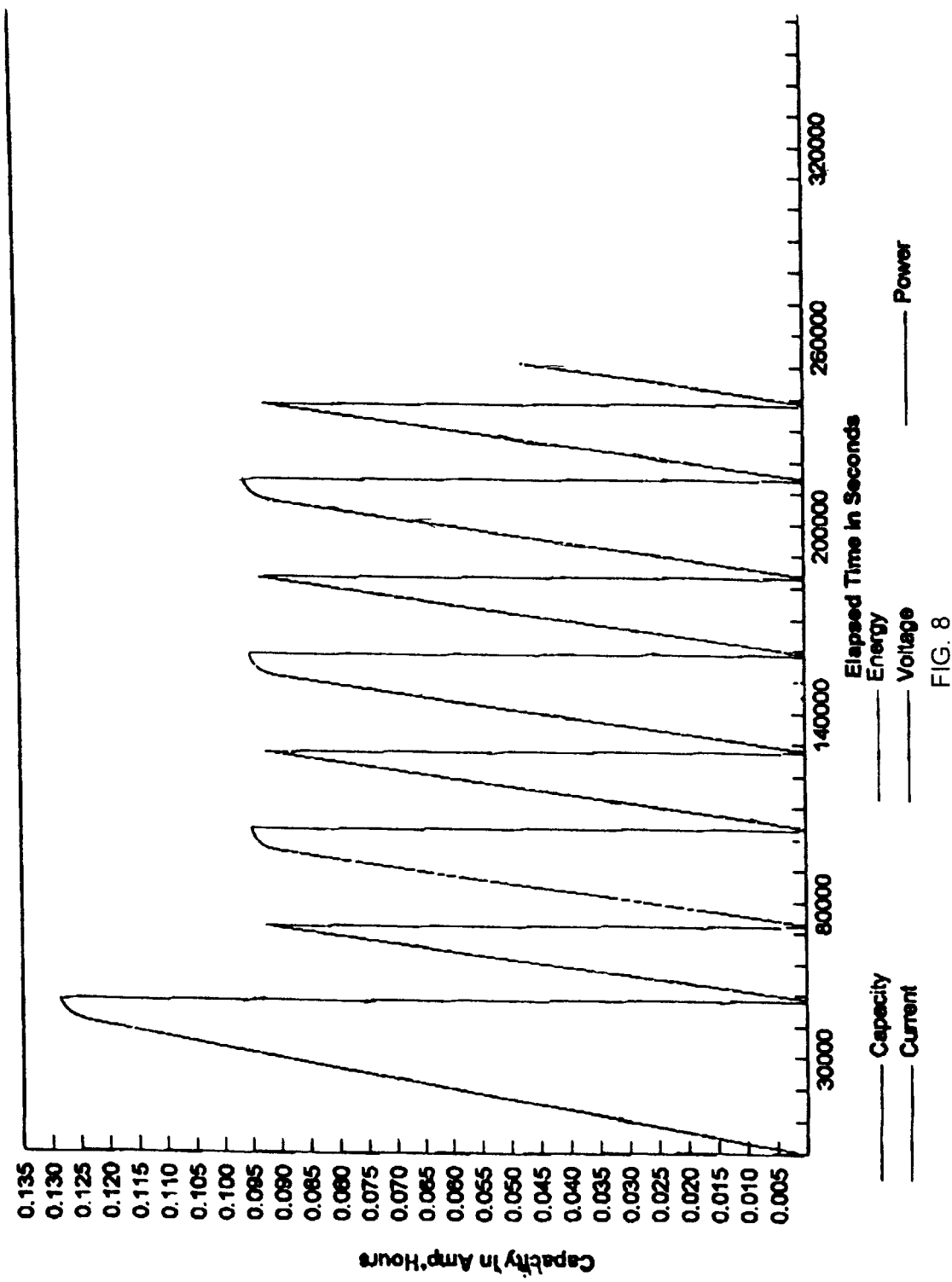
FIG. 8 is a capacity curve for the first of the secondary batteries (FIG. 5a and 5b) showing capacity curves for further cycles.

The bonding process is characterized by an increased total elapsed curing time of the electrode slurries as compared to the elapsed time of curing in normal air. This process of drying in a solvent vapor enriched or charged atmosphere allows for uniform drying, resulting in an electrode with a more dense concentration of active materials than electrodes obtainable by air drying. FIGS. 7 and 8 are scanning electron micrographs of the separator and electrode composite.

The foregoing process allows the joining of an electrode domain and a separator domain by the formation of a boundaryless bond between the electrodes and separator, which may be characterized in various ways.

Figure 1B:
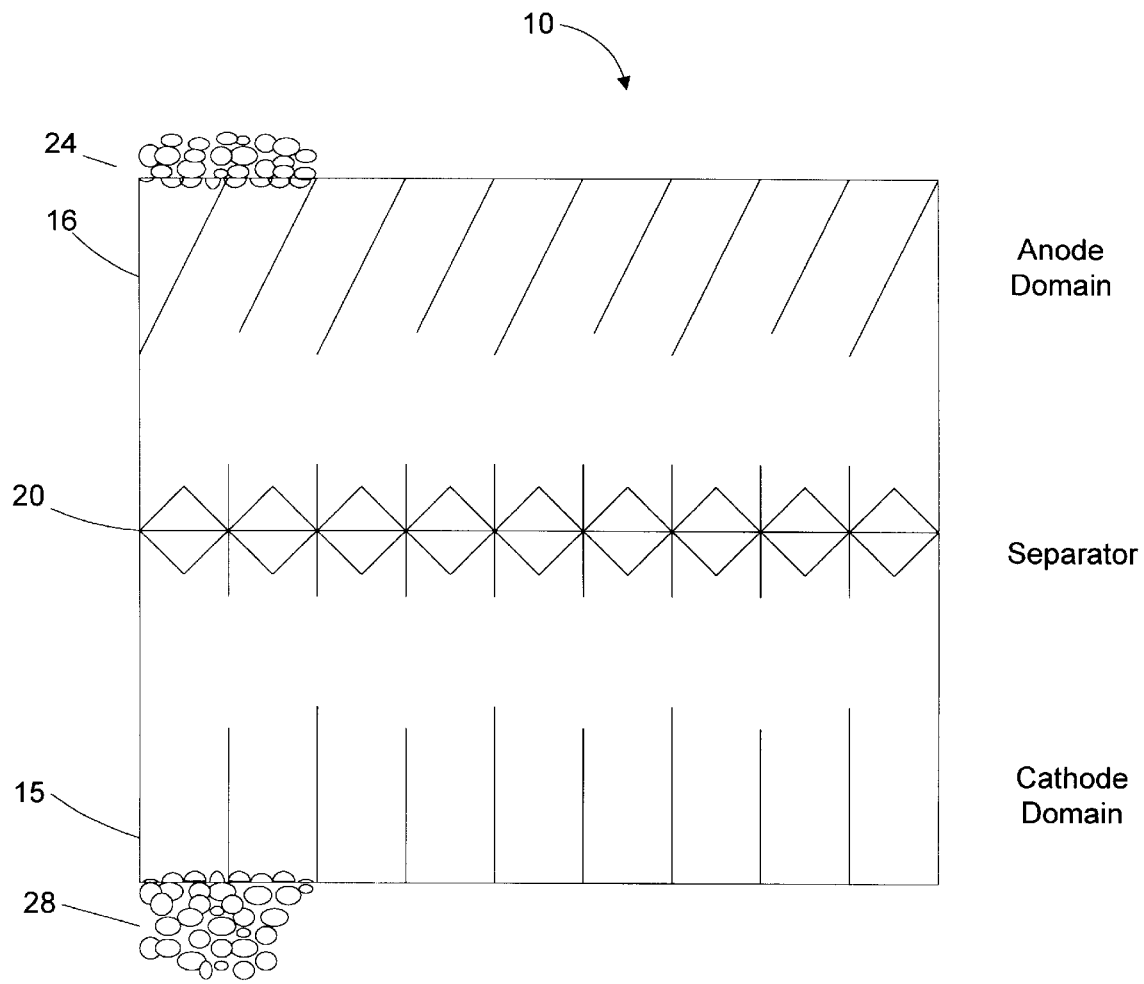
FIG. 1b is a single layer deposition without a metal strip.
Figure 1C:
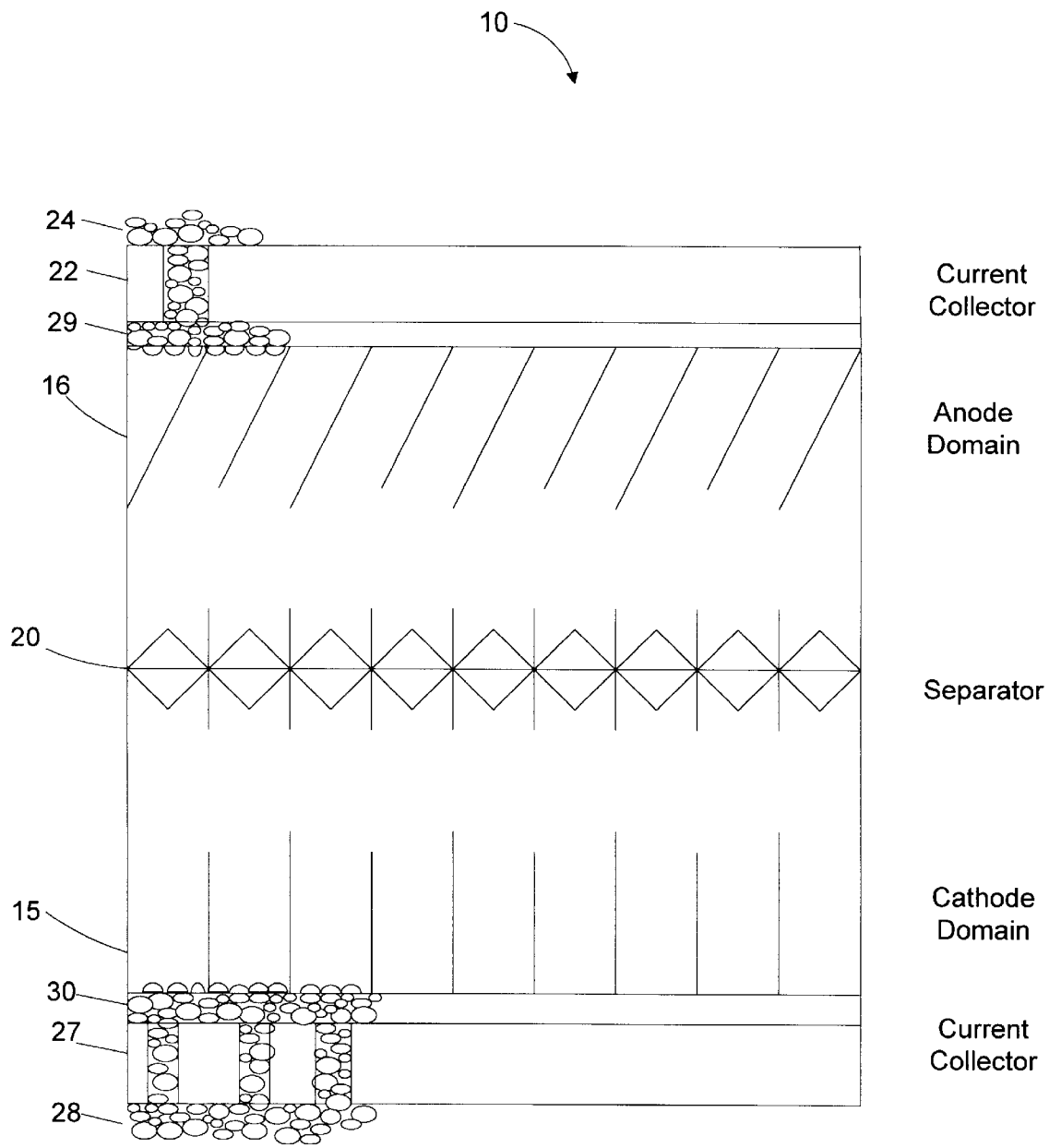
FIG. 1c is a three layered embodiment with a basement droplet layer, a second metallic strip layer, and a droplet particle outer layer.

First, referring to FIG. 1, the composite separator-electrode 10 may be characterized as having three domains, a cathode domain 15, an anode domain 16, and a separator domain 20. The boundaries of the separator domain and electrode domain are merged creating a seamless unitary structure. The cathode domain and anode domain include their respective electrode active materials. The separator domain may include a porous, fibrous mat, preferably coated and impregnated with a coating polymer. The cathode domain 15, anode domain 16, and separator domain 20 are joined together seamlessly and exist within the electrode and separator composite 10. Because of intermingling of layers, no interface exists between the anode, cathode and separator domains. However, the domains retain discreet functionalities. The electrode domains are capable of reversibly accepting and donating ions during successive charging and discharging of the battery; the separator domain remains permeable to ion migration during charging and discharging and provides a suitable separation of the electrode domains to prevent short circuiting. The composite electrode-separator may be further characterized as integral or seamless. Seamless means that no interface exists between the electrode containing polymer and separator coating polymer; the layers are intermingled. In contrast, conventional batteries have true interfaces between different layers, as in laminated sheets of electrode and separator films.

Second, a composite, unitary electrode and separator structure is formed that is characterized by a matrix of polymer in which the electrode active material and polymer mat are embedded. When the electrode slurry is applied to the polymer coating portion of the separator, the solvent present in the electrode slurry partially dissolves the polymer coating, resulting in the rearrangement of the polymer matrix at the surface of the separator by dissolution, so that the polymers of the electrodes become interspersed with the polymer molecules of the polymer coating of the separator. The polymer matrix where the electrode and separator domains join is therefore indistinguishable from the polymer matrix at any other point in the composite.

The electrode and separator domains are juxtaposed within the composite electrode-separator. This means that the electrode domain and separator domain are arranged next to each other. The separator domain and electrode domain may be characterized as having length and breadth. The electrode domain and separator domain are disposed so that they have contact along their length and breadth. Just as the domains are juxtaposed, the components of the domains are juxtaposed. The electrode active materials are disposed so as to have contact with the length and breadth of the separator.

These foregoing descriptions assume that the electrode polymers are the same polymer as the separator saturating polymer. The electrode polymers and separator polymers may be different, as long as they are dissolvable in the same solvent. In a case where the polymers are different, the bond is characterized by rearrangement of the polymer matrix of the surface of the separator so that the polymer of the electrode is uniformly interspersed with the separator polymer. A seamless bond is formed because the polymers are interspersed at the original slurry-separator interface.

In contrast to other bonding techniques, this bonding process results in the formation of a flexible electrode of uniform density, as demonstrated by electron micrography, having intimate intermingled contact with the separator along the electrode's entire breadth and length. Curing in a solvent enriched atmosphere avoids problems associated with curing in normal air. These problems include the tendency of the electrode to crack and debond at the electrode-separator interface. When curing occurs by air drying, the solvent evaporates quickly from the slurry surface. This results in the formation of a dense, dried "skin" on the surface of the electrode as well as contraction of the electrode at its surface. The interior electrode (area under the skin layer) then dries at a slower rate, resulting in a stress gradient. This stress gradient due to drying shrinkage causes the electrode to curl, and the associated curling stresses cause the electrode to crack near the electrode's interface with the separator. These cracks result in a loss of contact between the electrode and separator, thus compromising the efficiency of the battery. This is supported by the observation that electrodes air dried on a separator have debonded during cycling. Additionally, manual peel tests show a lower bond strength when air dried.

The slurry may be applied to the separator in a variety of configurations. For example, a sheet of separator may be coated with an electrode slurry along its entire length and width. The resulting composite electrode-separator can then be cut to the desired size. Alternatively, the electrode slurry may be applied to a separator sheet in a series of discreet areas separated by areas with no slurry coating. Such a configuration would allow the folding of the resulting battery or allow smaller batteries to be cut from the supporting separator sheet without the shorting concerns associated with cutting through active materials.

The present secondary battery structure may be manufactured with components having a wide variety of shapes and sizes. Since the composite remains highly flexible, the battery components can be embedded within the very structure of the object to be powered. Because of the capability for a large number of recharging cycles, the lifetime of the battery may often be longer than that of the powered article itself.

Referring again to FIG. 1, the current collectors 25 and 27, at the anode and cathode respectively, are generally formed in two layers. A flat strip of metal (22 and 28) has a surface facing the respective electrode. The metal strip is made of expanded metal, may be woven, or be fabricated from a solid piece, and has a plurality of open spaces. These spaces can be of any design or shape. If fabricated from solid metal, a plurality of perforations may be introduced by conventional methods. A useful product is X-MET manufactured by Crock Manufacturing, which is a expanded metal copper or aluminum grid of diagonal spaces The ratio of open space to structural metal is about 3 to 1 up to about 30 to 1. The open spaces define the interacting surfaces where metal droplets fuse to or embed in the plastic material of the electrode. The grid provides structural support. There is a balance between the degree of structural support required in a particular battery, and the degree of adhesion sought. Since the battery is expected to flex during charge and discharge cycles, care must be taken to keep the mesh size of the grid large enough (and the thickness and crosslink dimensions small enough) that the composition does not become so rigid that flexation will produce cracking of the outer collector layer of partially coalesced metal droplets.

The droplets are produced by conventional thermal spraying. In thermal or arc spraying, a combustible gas or electric arc is used to generate sufficient heat to melt the metal coating material. The molten metal is then accelerated through a compressed gas, causing it to be propelled forward in a confined stream. The droplets impact the substrate surface at a rate of speed proportionate to the gas pressure. While the individual droplet integrity is maintained, there is a flattening effect and partially coalescing of the droplets together to form a generally continuous layer. The pattern of delivery may be varied from circular to elliptical. The spray dimension is a function of the distance from the emission nozzle. The concentration of droplets is greatest at the center and lesser at the edges.

Figure 2D:
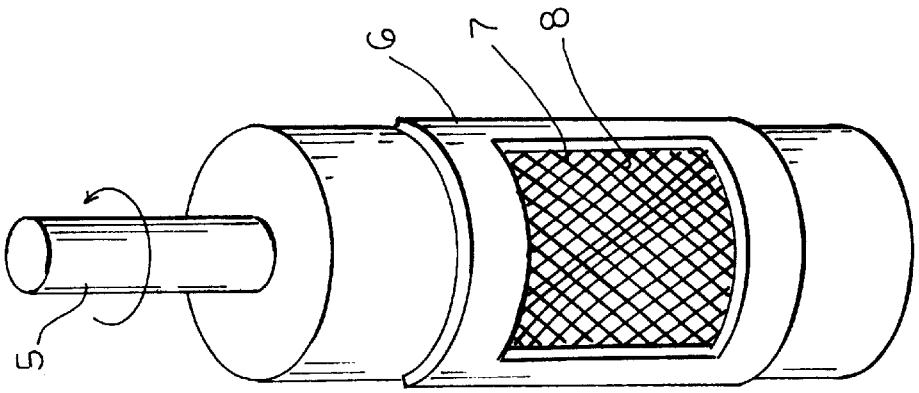
FIGS. 2a through 2d depict an apparatus for fixing a metallic grid onto electrodes for arc spraying of molten metallic droplets.
Figure 2C:
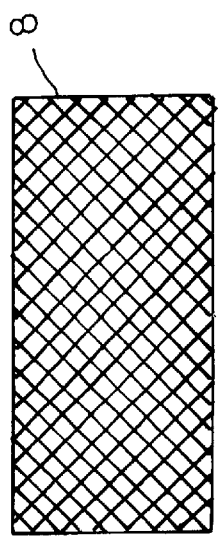
Figure 2B:
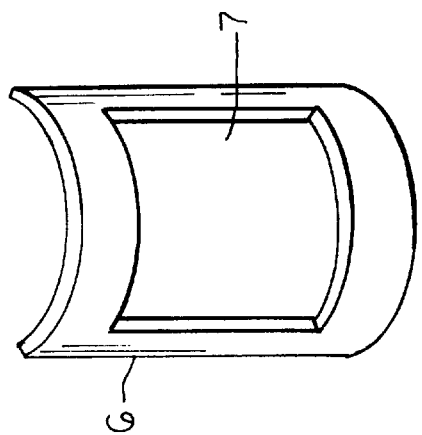
Figure 2A:
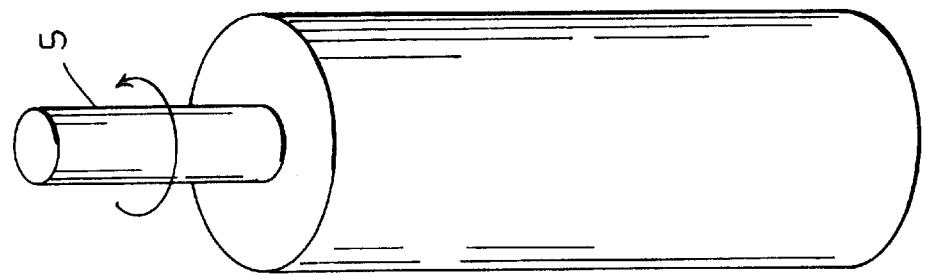
Figure 3:
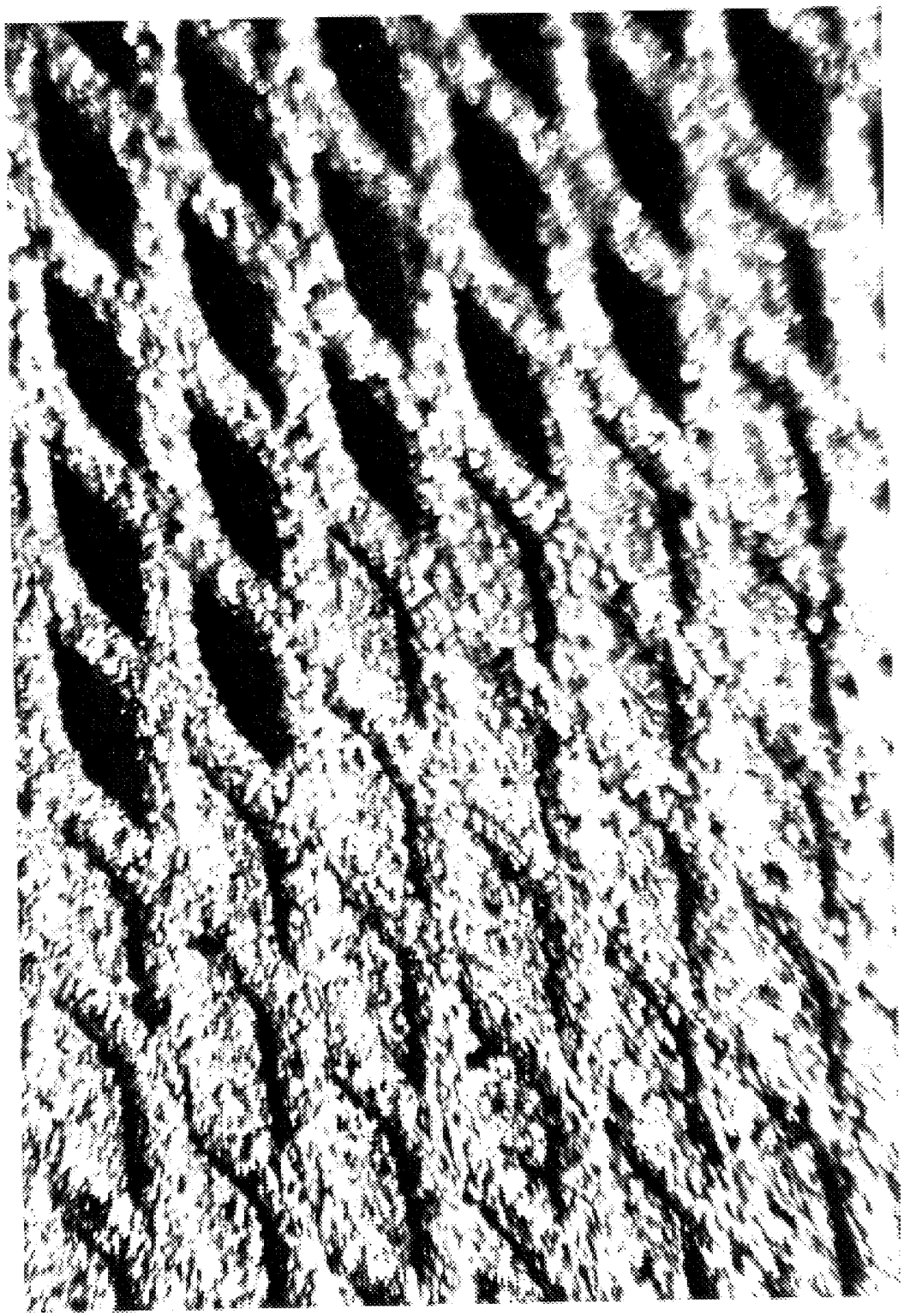
FIG. 3 is enlarged micrographs showing an XMET grid coating with solidified partially coalesced metallic (copper) droplets.

In order to facilitate a uniform application, it is necessary to move the nozzle spray pattern along the electrode, and coat by a series of passes. FIG. 2 depicts a device for coating an electrode. FIG. 2a shows a cylinder 3 mounted on a shaft 5, capable of rotating back and forth. An electrode member (not shown) is anchored against the cylinder surface by a masking plate 6 shown in FIG. 2b. The masking plate 6 has an aperture 7, which provides the spray template. This aperture may be varied in size and shape, for the dimensions of battery desired. When assembled as shown in FIG. 2d, the electrode is ready for coating. When the spray gun is activated to discharge droplets, the cylinder is rotated back and forth, to make at least two passes of the surface. The Y axis can be controlled by either vertical movement of the gun or of the cylinder. To assure uniformity, the speed of travel can be varied to give a longer exposure at the edges, if desired.

The temperature at which the sprayed molten metal is deposited is a function of the initial temperature and the cooling rate factors once the droplets leave the nozzle. The slower and farther they travel, and the cooler the target, the faster they will cool. The transition melting point is the temperature, for a given pressure, distance, and target temperature, to which the molten metal must be heated to cause embedding of droplet particles to a depth of at least ½ the diameter of the droplet particle (0.1 ro 1 micron). It is also the temperature at which partial droplet coalescence occurs without complete merger of the individual drops into a uniform mass. A typical protocol for copper and aluminum arc spraying is set forth in the following table.

TABLE 1

| | Current Gun Parameters | | |
|---|---|---|---|
| MATERIAL | VOLTS (±1 volt) | AMPS (±2 amps) | PRESSURE (±5 psi) |
| Aluminum | 40.5 | 15 | 90 |
| Copper | 37 | 25 | 80 |

(± tolerances are typical)

Figure 9:
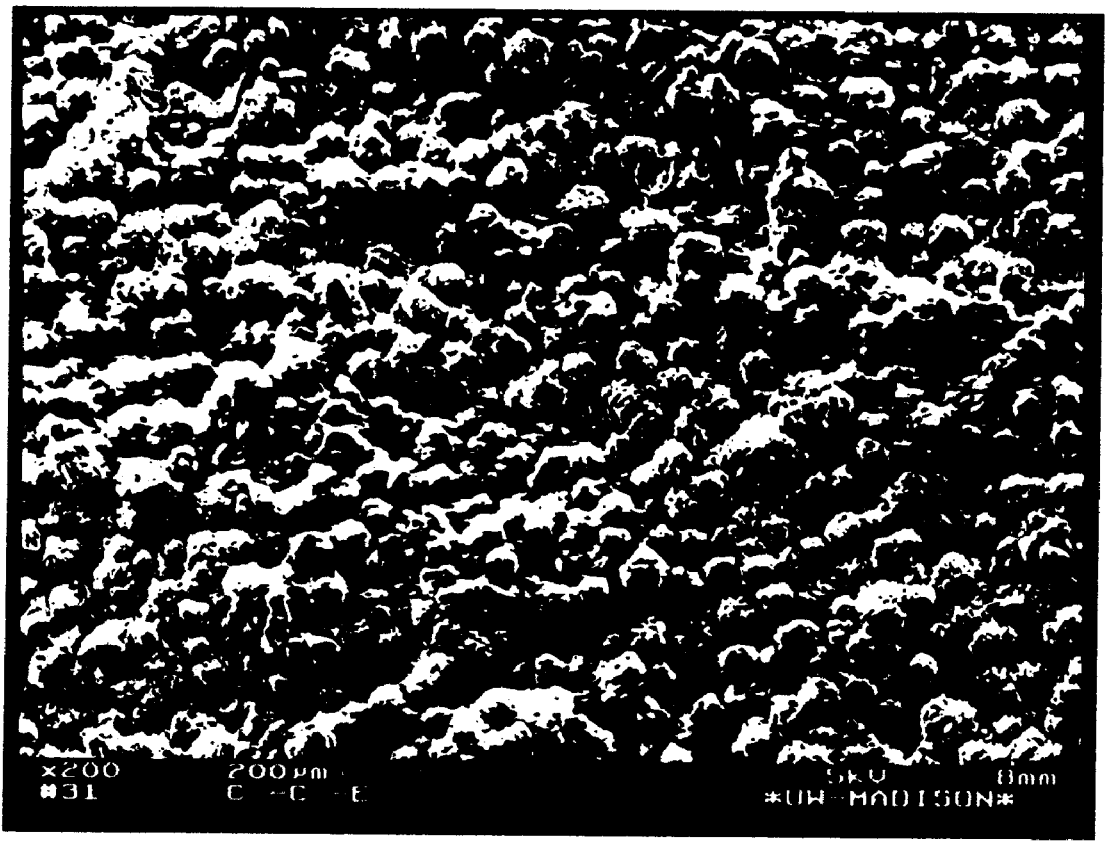
FIG. 9 is a photomicrograph of the facing surface of a collector from which the electrode has been dissolved away.

It is apparent that if the plastic electrode is then dissolved off the composite electrode-current collector structure with excess solvent such as acetone, and the interfacing surface is examined, it presents as a very bumpy texture because of the half sphere protuberances of metal which had theretofore anchored the metal current collector to the electrode. This bumpy texture not only serves as an anchor to increase the strength of the bond between the collector and electrode, but it also greatly amplifies the surface area of contact, making electron collection much more efficient, and reducing by as much as 10 fold the measured electrical resistance. Please refer to FIG. 9 for a micrograph of one such bumpy surface.

The arc or thermal stray system is conventionally and commercially available. One such machine that has efficacy on a laboratory scale is Model BP400 manufactured by Praxair Surface Technologies. Another vendor of equipment is Miller Thermal Inc. It should be noted that this process utilizes a true thermal spray. The nozzle emits actual droplets, which are to be distinguished from other methods of deposition such as vapor deposition.

The general battery construction of a lithium ion secondary battery is particularly adapted to the current collectors of the present invention. However, the invention is applicable to applying a current connector to any material for which a transition melting temperature can be determined. This approach has particular efficacy in the field of batteries containing thermoplastic electrodes.

In an alternative embodiment, the arc spray metal droplets may be deposited directly onto the surface of the electrode without an intervening grid strip. It has been determined empirically that batteries having collectors made in this way, will cycle for only 10–20 cycles before failing due to the formation of cracks in the collector, which interrupt the flow of electrons. However, for certain uses this number of cycles is sufficient, and elimination of the grid simplifies the process and reduces materials and manufacturing costs. However, the current collector configuration with a grid is preferred.

In an even more preferred embodiment of the present collector, a very thin layer of droplets (about 0.05 micron) is first applied to the entire surface of the electrode. The grid strip is then applied. Before the masking face is positioned a plastic screen having open spaces of about ¼ inch is placed over the grid, and then the mask face is positioned. This results in a significant force being applied to hold the grid down firmly against the electrode. The arc spray is then reapplied as described above until the grid is uniformly coated. The resulting joinder is impressively strong, and batteries made with collectors in this manner will last in excess of 175–300 charging cycles. Further advantages of the present invention will be apparent from the Examples which follows.

EXAMPLE 1

A separator according to the method of the invention was made as follows: a base non-woven polyethylene fiber sheet (Web Dynamics, PX0074) was purchased from the vendor. The manufacturer's specifications of the material include a thickness dimension of 2.5 mils and a pore size not to exceed 0.1 mm. The product is manufactured having a rough (non-calendared) surface on one side and a smooth (calendared) surface on the other side. The density of the material was empirically determined as 28 g/m$^2$.

The polymer coating step was carried out on approximately 25 inch long by 6 inch wide sections of the fiber sheets. A coating mixture was prepared containing 19 g Kynar® 2801 (range 5–30w) brand polyvinylidene difluoride copolymer, 33 g (range 10–35%) dibutyl adipate (as a plasticizer), and 135 ml (balance) of reagent grade acetone. The copolymer and the acetone were measured into a sealed container, shaken for approximately five minutes, then allowed to stand for one hour to dissolve the copolymer. The plasticizer was then added, the container resealed and shaken for approximately one minute, then allowed to stand for fifteen minutes to equilibrate.

Figure 6A:
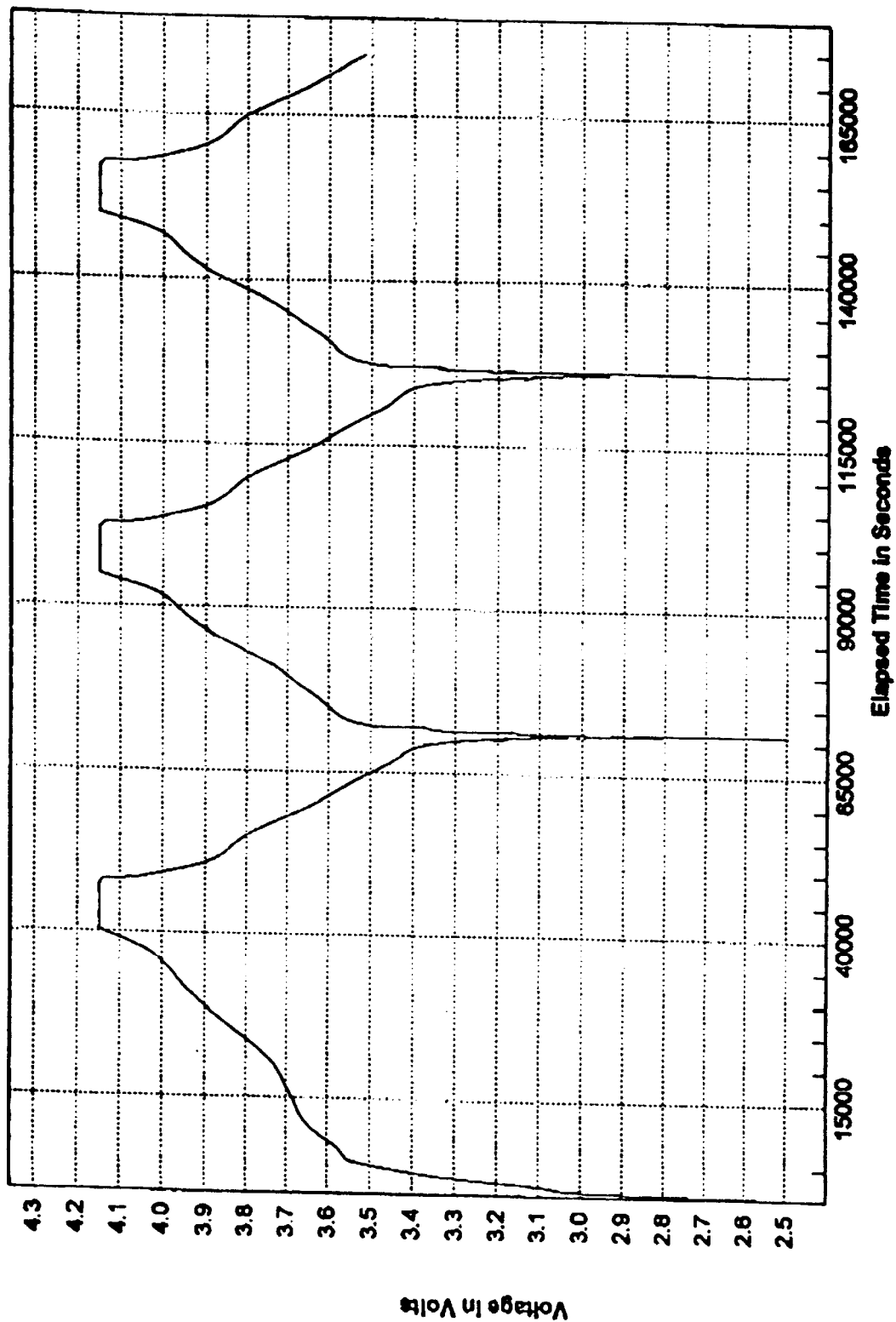
FIGS. 6a and 6b are rectilinear plots showing the charge and discharge voltage profiles for a second lithium ion battery of this invention (a) and the corresponding capacity curves (b).
Figure 6B:
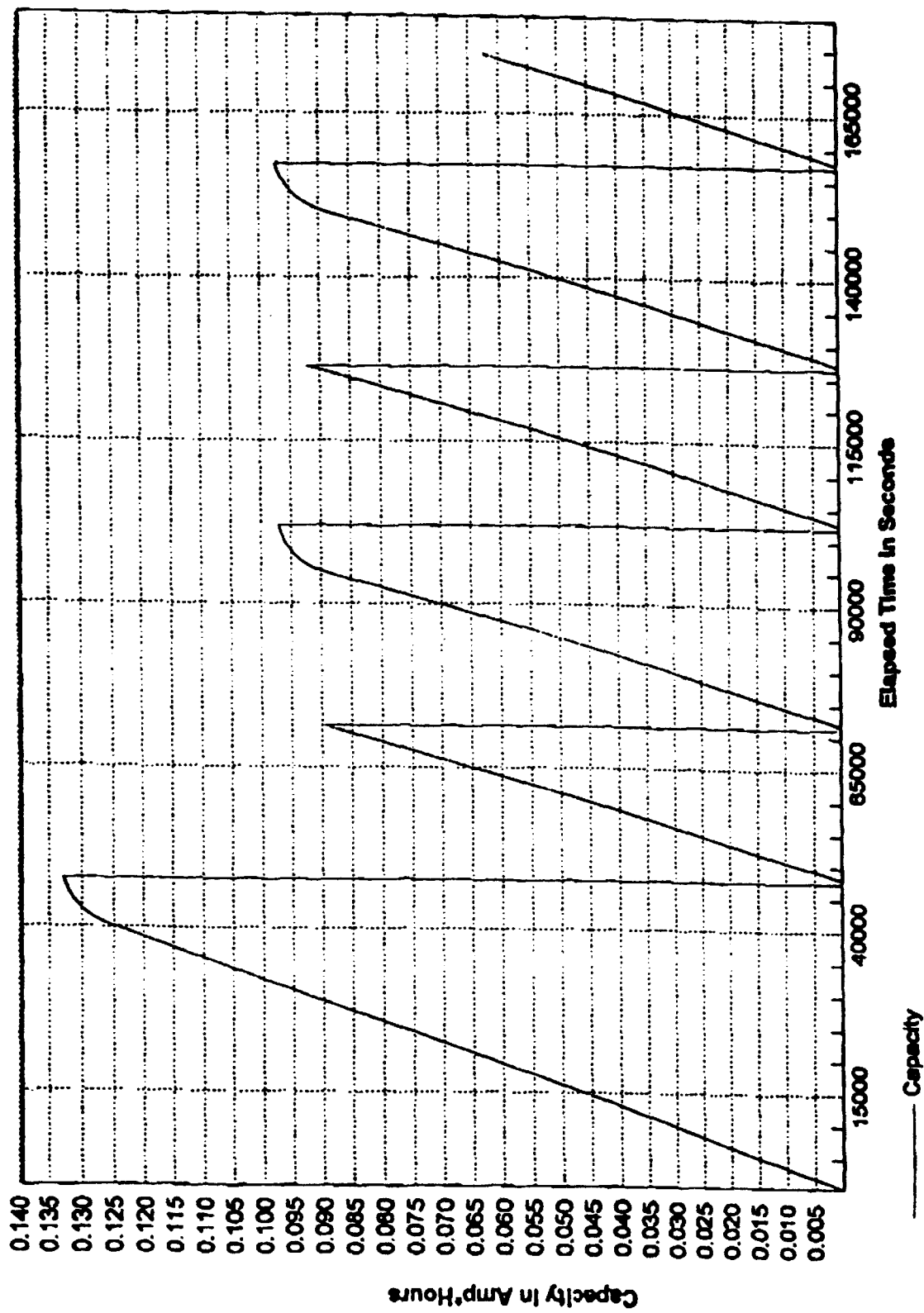

A sheet of backing paper approximately 0.004" thick was placed on top of a fine mesh screen, having a 200×200 mesh configuration which was positioned on top of the vacuum plate having 51×23 ⅛th inch holes bored through to a common vacuum manifold. The section of fiber sheet was then placed on a vacuum table with the rough side facing down onto the backing paper. An excess of coating mixture (approximately 10 ml) was spread onto the vacuumized fiber sheet and distributed smoothly over the surface with a casting block having a six mil gap. After vacuum drying the sheet was reversed, and coating mixture was applied through an eight mil gap to the rough side. After drying the sheet was again reversed, and coating mixture was applied through a three mil gap to the original, first or smooth side over the previous coating layer. Finally after drying the sheet was again reversed, and coating mixture was applied through a three mil gap to the second or rough side over the previous coating layer. Coated weight was approximately 105 g/m$^2$, with a base thickness of 2.5 mil and a coated thickness of about 4.5 mil. Table 4 shows the relation of Variac setting to the vacuum values generated in either pounds per square inch or millimeters of mercury. These values are plotted in FIG. 6.

The separator so produced was incorporated into a solid state lithium ion battery as follows: the cathode comprised 65 percent LiNiO$_2$ (FMC) dispersed in a matrix of substantially similar composition to the copolymeric coating of the separator. The plastic electrode also contained 5.5 percent carbon black (Super-P brand) to improve conductivity. A slurry of the cathode material was applied to one side of the separator and was dried while suspended upside down in a solvent vapor charged chamber until the acetone (solvent) was dissipated. See Table 3 for standard formulations.

The anode comprised 65 percent graphite (MCMB 2528 manufactured by Osaka Gas) in a slurry similar to the cathode, and was applied to the reverse side of the separator and dried in a similar manner. This unitary structure was then placed into an ether bath to remove the plasticizer followed by a vacuum drying process to remove residual ether.

Following drying, current collectors and appropriate foil leads were attached to the anode (copper) and cathode (aluminum). The finished unitary, bonded battery structure was then placed into a flexible aluminized plastic housing which was then sealed across the foil leads and both sides. This package was then placed into a moisture and oxygen free chamber where a predetermined quantity of electrolyte (1.2 ml to 1.4 ml) was dispensed into the package. The electrolyte composition was ethylene carbonate, dimethyl carbonate and 1 molar $LiPF_6$. The complete electrolyte may be purchased commercially. Following electrolyte dispensing, the open end of the package was sealed to prevent oxygen or moisture ingress and electrolyte loss. Following removal from the moisture free and oxygen free chamber, the battery was allowed to stand for 16 hours at ambient temperature and pressure for the electrolyte to absorb into the electrodes and separator.

The following tests were performed on this battery using an Arbin cycler. The battery was charged in a conditioning cycle at constant 11 milliampere current for up to 12 hours or until a voltage endpoint of 4.15 volts was attained. The 4.15 volt potential was held constant for an additional two hours. After a ten minute rest, the battery was discharged at 14 milliamperes down to 2.5 volts.

In the second, and subsequent cycles, current was applied at 14 milliamperes for up to 10 hours or until a voltage endpoint of 4.15 volts was attained. The 4.15 volt potential was again held constant for an additional two hours. After a ten minute rest, the battery was discharged at 14 milliamperes down to 2.5 volts.

Figure 5A:
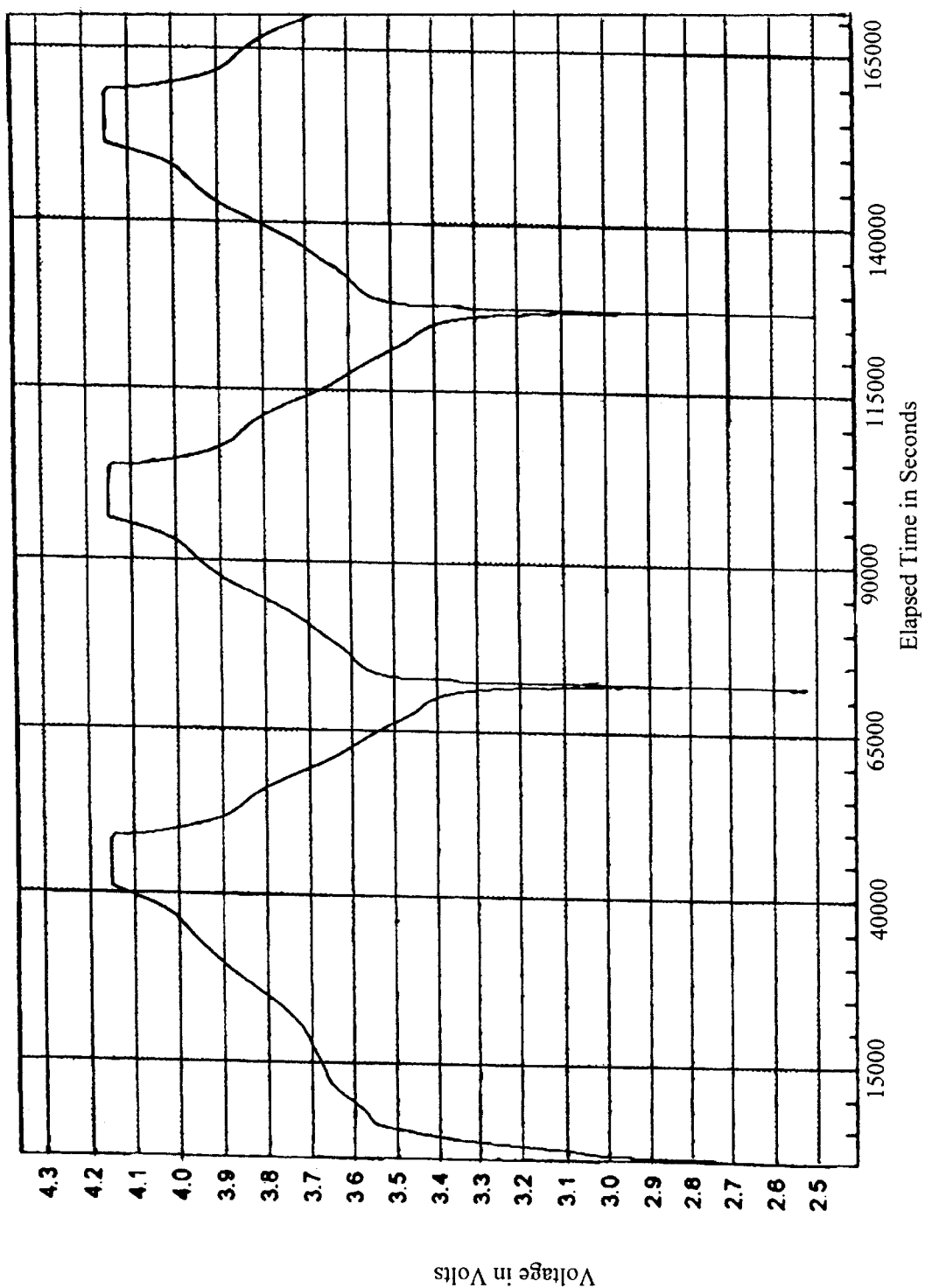
FIG. 5a and 5b are rectilinear plots showing the charge and discharge voltage profiles of a typical secondary lithium ion battery of this invention (a) and the corresponding capacity curves (b).
Figure 5B:
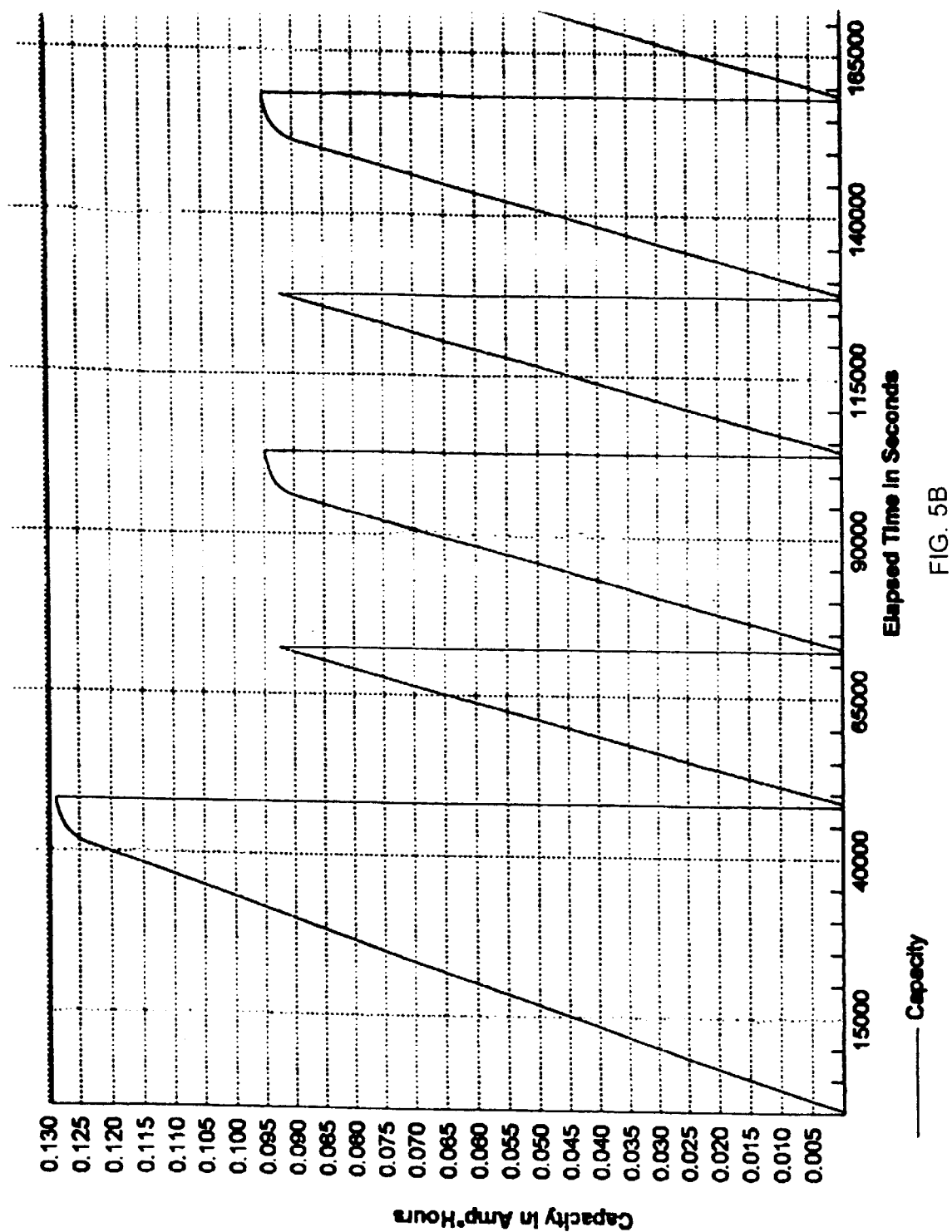

The plots (FIGS. 5a and 6a) show minimal voltage drop during the transition from charge to rest, indicating low internal resistance, which is attributable in large part to the excellent porosity of the separator. The flat slope of the charge curves indicates that the C/10 rate factor is in agreement with the expected capacity value. In the capacity curves (FIGS. 5b and 6b) each of the batteries shows that when subjected to repeated cycles of charge/discharge, there is an initial 95 mA hours in and 92 mA hours out, with a subsequent charge/discharge efficiency reproducibly and repeatedly attaining 97 percent (compare sharp discharge spike height to rounded charge spike height). FIG. 8 shows that there is no deterioration of capacity upon further charge/discharge cycles.

EXAMPLE 2

Figure 4A:
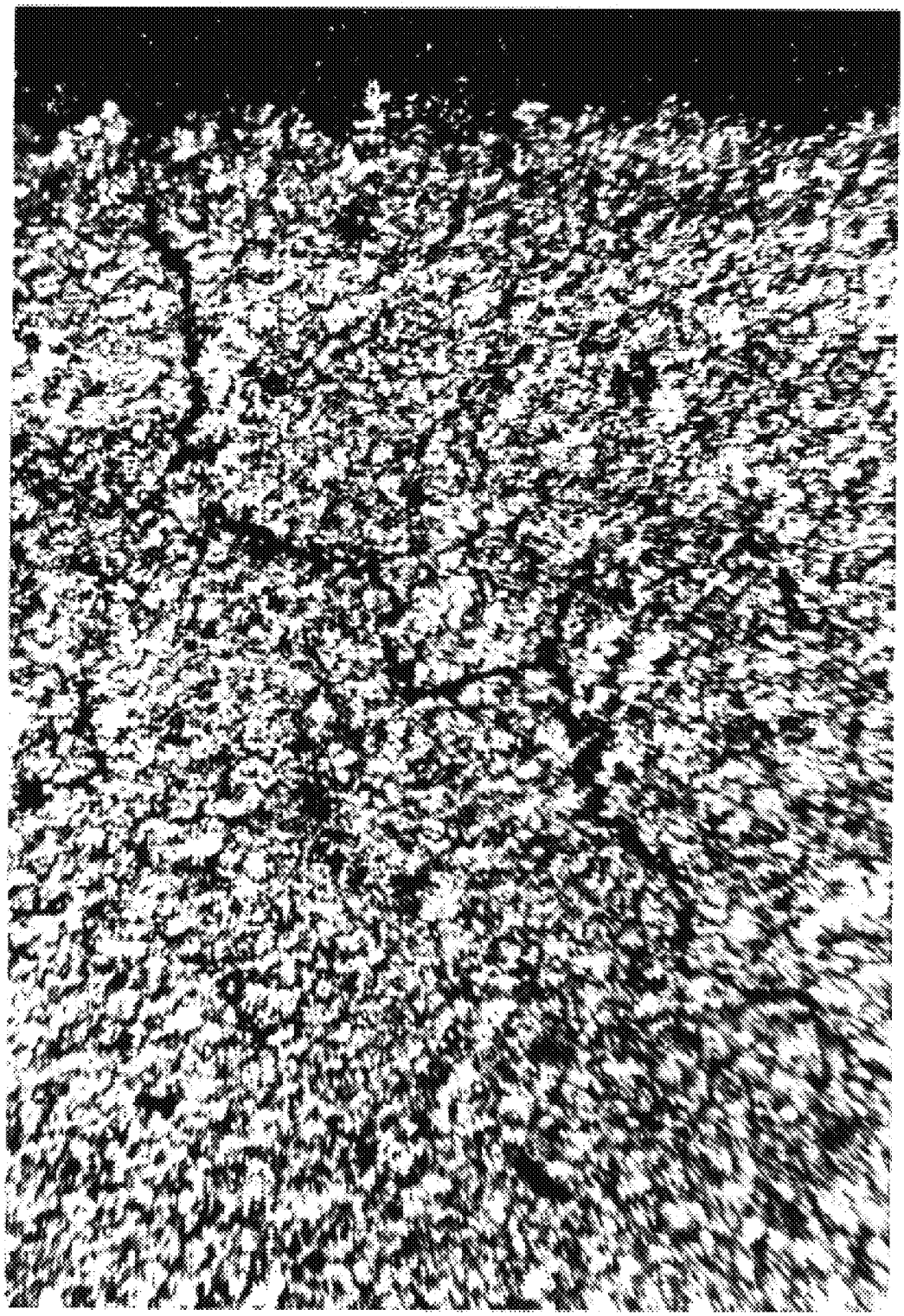
FIGS. 4a and b are an enlarged micrograph of an arc sprayed currently onto an electrode after cycling without first fixing a metallic grid onto the surface thereof.
Figure 4B:
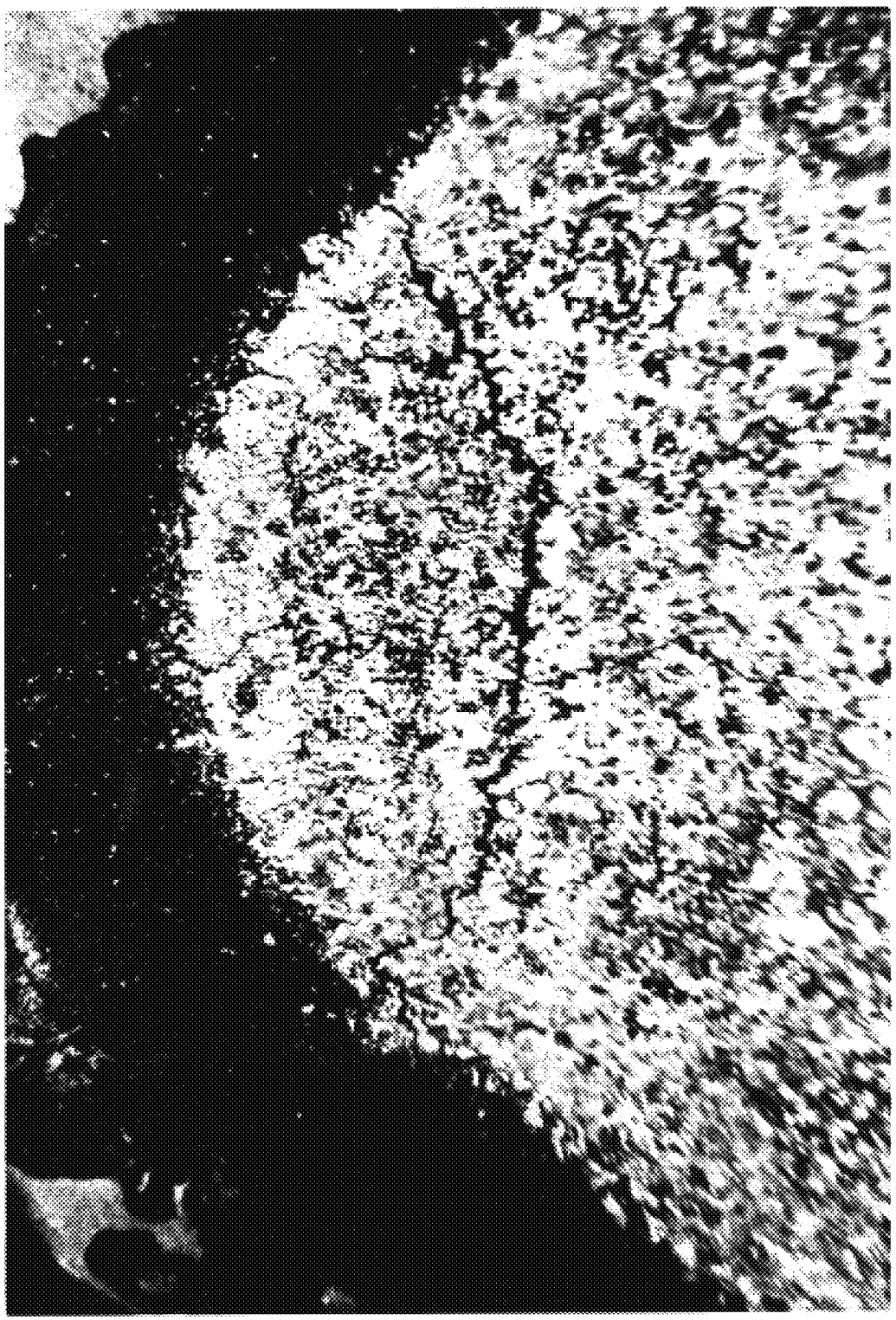

Batteries made as set forth above and according to the specifications contained in Table 3. In group 1, the current collector metallic droplets were coated directly onto the electrodes without a grid plate. In group 2, the droplets were first deposited in a very thin layer, followed by application of grid, and subsequent arc spraying. The batteries in group 1 failed in an average of 16 cycles. The batteries in group 2 were still cycling at approximately 125 cycles. FIG. 4 shows that the reason for battery failure in group 1 was the existence of prominent cracks in the current collector, as seen in the micrograph.

TABLE 2

| Material | Weight % | Wt-Acet | Wt % |
|---|---|---|---|
| STD CATHODE | | | |
| $LiNiO_2$ | 31.80 | 146.50 | 66.38 |
| Carbon Black | 2.65 | 12.20 | 5.53 |
| Kynar | 4.86 | 22.40 | 10.15 |

TABLE 2-continued

| Material | Weight % | Wt-Acet | Wt % |
|---|---|---|---|
| DBA | 8.60 | 39.60 | 17.94 |
| Acetone | 52.09 | 0.00 | 0.00 |
| | 100.00 | 220.70 | 100.00 |
| STD ANODE | | | |
| MCMB | 35.85 | 179.65 | 66.77 |
| Carbon Black | 1.99 | 9.97 | 3.70 |
| Kynar | 5.48 | 27.44 | 10.19 |
| DBA | 10.40 | 52.10 | 19.36 |
| Acetone | 46.29 | 0.00 | 0.00 |
| | 100.00 | 269.16 | 100.00 |
| STD SEPARATOR | | | |
| Kynar | 11.88 | 22.40 | 36.1 |
| DBA | 20.63 | 39.60 | 63.87 |
| Acetone | 67.50 | 0.00 | 0.00 |
| | 100.00 | 62.00 | 100.00 |

| Variac | PSI | mm Hg |
|---|---|---|
| TABLE COVERED WITH PLASTIC SIMULATOR FILM | | |
| 100 | 1.48 | 77 |
| 90 | 1.26 | 65 |
| 80 | 1.08 | 56 |
| 70 | 0.89 | 46 |
| 60 | 0.71 | 37 |
| 50 | 0.56 | 29 |
| 40 | 0.42 | 22 |
| 30 | 0.28 | 14 |
| TABLE COVERED WITH UNCOATED WEB DYNAMICS PX0074 | | |
| 100 | 0.80 | 41 |
| 90 | 0.70 | 36 |
| 80 | 0.60 | 31 |
| 70 | 0.51 | 27 |
| 60 | 0.42 | 22 |
| 50 | 0.33 | 17 |
| 40 | 0.25 | 13 |
| 30 | 0.17 | 9 |

EXAMPLE 3

Cathode material was cast onto paper using 20 mil shims. The electrodes were then dried and removed from the paper. Three strips of nine squares each (total 27 electrode squares) were made. A piece of aluminum expanded metal (Delker 2A15–077) was sandwiched between 2 electrode squares and laminated. The samples were extracted in ether (to remove plasticizer) and then arc sprayed on one side with aluminum. Eighteen squares were used to make a total of 9 cathode samples with embedded expanded metal. The remaining 9 electrode squares were extracted and arc sprayed on both sides with aluminum.

Resistance was measured using a multimeter (Fluke Model 8062 A; ±0.04 ohms accuracy). The samples were measured from the center of one face to the center of the opposite face. Some samples were damaged when arc sprayed and not measured. The readings from the remaining cathode samples are listed below.

TABLE 3

| Resistance (measured in Ohms) | |
|---|---|
| Expanded Metal | Arc Spray Only |
| 2.91 | 0.10 |
| 2.26 | 0.08 |
| 1.95 | 0.10 |
| 1.23 | |
| 1.90 | |
| 2.74 | |

These results indicate the higher conductivity (lower resistance) of the arc spray current collector over the laminated expanded metal. The expanded metal samples were 12–29 times more resistive than the arc spray samples, or about 20 times on average. This may be due to the higher surface area and mechanical bonding achieved using the arc spray.

What is claimed is:

1. A metallic current collector comprising a first layer consisting of a metal strip having a plurality of spaces traversing the thickness of the metal strip; and a second layer of the same or a different metal composed of a multiplicity of partially coalesced metallic droplet particles smaller in size than said spaces of said first layer and filling said spaces.

2. The metallic current collector of claim 1 wherein said first layer is a grid.

3. The metallic current collector of claim 1 wherein said first layer of a metal strip is perforated by holes of the same or different sizes.

4. An electrode-current collector bonded structure comprising a polymeric electrode having a surface facing a current collector having a surface facing said electrode, and also a surface opposite thereto; and a current collector comprising a first layer of a metal strip having a plurality of spaces filled with partially coalesced metallic droplets of the same or a different metal partially embedded in said electrode facing surface to form a bond, and a second further layer of partially coalesced metallic droplet particles bonding to said metal layer to form a surface of coalesced metallic droplets opposite said collector facing surface.

5. An electrode-current collector bonded structure comprising a polymeric electrode having a surface facing a current collector, and also a surface opposite thereto; and a current collector comprising a first layer comprising a coating of partially coalesced metallic droplet particles partially embedded over the facing surface of said electrode to form a bond, a second layer comprising a metal strip containing a plurality of spaces filled with said metallic droplet particles, and a third layer of partially coalesced metallic droplet particles forming a surface opposite said collector facing surface.

6. In a secondary lithium ion battery having a housing, a separator, polymeric negative and positive electrodes having inner surfaces positioned continuous to said separator surfaces, an electrolyte solution saturating said electrodes and separator, and a first and second current collector contiguous to said electrodes, the improvement comprising a first current collector comprising a first layer of a metal strip having a plurality of spaces filled with partially coalesced metallic droplets of the same or different metal partially embedded in said contiguous negative electrode outer surface to form a bond, and a second layer of partially coalesced metallic droplets coating said expanded metal layer to form a surface of partially coalesced metal droplets, and a second current collector comprising a first layer of expanded metal different from the metal of said first current collector having a plurality of spaces filled with partially coalesced metal droplets of the same metal or a different metal as the second current collector first said layer, but different from the expanded metal or coalescing metal of the first current collector, partially embedded in said contiguous positive electrode outer surface to form a bond, and a second layer of partially coalesced metallic droplets bonding to the second current collector first layer to form a surface of partially coalesced metal droplet particles.

7. A method of applying a current collector having a first layer of expanded metal having inner and outer sides and a plurality of open spaces traversing the thickness of the expanded metal layer, and a second layer to an electrode, comprising providing a polymeric electrode having an outer surface and a transition point providing a first contiguous metal strip layer, and positioning said metal layer contiguous to said electrode outer surface, and thermal spraying molten metal droplets at a temperature at or greater than the transition point of said polymeric electrode onto the outer side of said positioned metal strip layer until there is formed a bonded coating of partially coalesced droplets.

8. The method of claim 7 wherein said thermal spraying step is arc spraying.

* * * * *